(12) United States Patent
Banikazemi et al.

(10) Patent No.: US 9,058,244 B2
(45) Date of Patent: Jun. 16, 2015

(54) DURABLE AND COHERENT CACHE TRANSACTIONS BETWEEN VOLATILE AND NON-VOLATILE MEMORIES

(75) Inventors: Mohammad Banikazemi, Yorktown Heights, NY (US); John Alan Bivens, Yorktown Heights, NY (US)

(73) Assignee: INTERNATIONAL BUSINESS MACHINES CORPORATION, ARMONK, NY (US)

( * ) Notice: Subject to any disclaimer, the term of this patent is extended or adjusted under 35 U.S.C. 154(b) by 121 days.

(21) Appl. No.: 13/613,704

(22) Filed: Sep. 13, 2012

(65) Prior Publication Data
US 2014/0075122 A1 Mar. 13, 2014

(51) Int. Cl.
G06F 12/00 (2006.01)
G06F 11/00 (2006.01)
G06F 12/08 (2006.01)
G06F 9/46 (2006.01)

(52) U.S. Cl.
CPC ............ G06F 11/00 (2013.01); G06F 12/0891 (2013.01); G06F 12/0828 (2013.01); G06F 9/467 (2013.01)

(58) Field of Classification Search
CPC . G06F 12/121; G06F 12/126; G06F 12/0828; G06F 12/0802; G06F 12/0815; G06F 12/0891; G06F 12/0846
USPC .......................................... 711/142, 143, 144
See application file for complete search history.

(56) References Cited

U.S. PATENT DOCUMENTS

| | | | |
|---|---|---|---|
| 7,389,308 B2 | 6/2008 | Bailey | |
| 7,765,186 B1 | 7/2010 | Hu et al. | |
| 7,801,866 B1 * | 9/2010 | Kathuria et al. | 707/682 |
| 2003/0046495 A1 | 3/2003 | Venkitakrishnan et al. | |
| 2008/0301256 A1 * | 12/2008 | McWilliams et al. | 709/214 |
| 2010/0106754 A1 * | 4/2010 | Condit et al. | 707/822 |
| 2010/0306256 A1 | 12/2010 | Blackman | |
| 2012/0072656 A1 | 3/2012 | Archak et al. | |

OTHER PUBLICATIONS

Condit et al., "Better I/O through byte-addressable, persistent memory," Oct. 2009, ACM, SOSP '09 Proceedings of the ACM SIGOPS 22nd symposium on Operating systems principles, pp. 133-146.*
Valos et al., "Mnemosyne: Lightweight Persistent Memory," Mar. 2011, ACM, ASPLOS XVI Proceedings of the sixteenth international conference on Architectural support for programming languages and operating systems, pp. 91-104.*
Banikazemi et al., "Eucalyptus: Support for Effective Use of Persistent Memory," May 2012, IEEE, 2012 IEEE 26th International Parallel and Distributed Processing Symposium Workshops & PhD Forum (IPDPSW).*

* cited by examiner

*Primary Examiner* — Reginald Bragdon
*Assistant Examiner* — Thanh D Vo
(74) *Attorney, Agent, or Firm* — F. Chau & Associates, LLC

(57) ABSTRACT

A system for conducting memory transactions includes a non-volatile main memory and a memory buffer including a plurality of cache lines. Each of the cache lines includes content and one or more bits signifying whether a memory transaction corresponding to the content of the cache line has been performed to completion and whether the content of the cache line matches content of a corresponding location of the non-volatile main memory. When the one or more bits of a cache line of the plurality of cache lines signifies that the transaction has been performed to completion and the content of the cache line does not match the content of the corresponding location of the non-volatile memory, access to modify the content of the cache line is restricted until the content of the cache line is written to the corresponding location of the non-volatile main memory.

11 Claims, 5 Drawing Sheets

DURABLE AND COHERENT CACHE TRANSACTIONS BETWEEN VOLATILE AND NON-VOLATILE MEMORIES

BACKGROUND

1. Technical Field

The present disclosure relates to storage-class memory and, more specifically, to durable transactions with storage-class memory.

2. Discussion of Related Art

In modern computer systems, there is often a need for multiple machines, multiple microprocessors, and/or multiple microprocessor cores to access a shared memory. Under such an arrangement, problems may emerge as multiple computing entities try to access the same file from the same memory at the same time. For example, two entities may desire to write to a file at the same time or one entity may desire to read a file as another entity is writing to it. The possibility therefor may exist that files become corrupted or overwritten in such a way that valid changes are lost.

One approach to managing memory access by multiple computing entities is referred to as transactional memory (TM). TM systems are designed to control access to memory so that memory transactions remain sequential and accurate. TM systems are commonly used, for example, in banking so that account balances may be accurately maintained even as transactions to bank accounts may be initiated from multiple sources at substantially the same time. Additionally, TM systems may permit a transacting source to perform a transaction in multiple steps, for example, funds from one bank account may be transferred to another bank account by first debiting the funds from the first account and then adding the funds to the second account.

TM systems generally incorporate volatile memory such as DRAM as a main memory. Volatile memory such as DRAM may be well suited for use in TM systems as it has sufficient speed to process transactions without delay. However, as volatile memory may lose its contents upon power failure, database systems that incorporate transactional memory generally maintains one or more transaction logs so that in the event of a loss of memory, due to power failure or other reasons, the correct state of the main memory may be restored by reconciling the main memory with the logs.

BRIEF SUMMARY

A system for conducting memory transactions includes a non-volatile main memory and a memory buffer including a plurality of cache lines. Each of the cache lines includes content and one or more bits signifying whether a memory transaction corresponding to the content of the cache line has been performed to completion and whether the content of the cache line matches content of a corresponding location of the non-volatile main memory. When the one or more bits of a cache line of the plurality of cache lines signifies that the transaction has been performed to completion and the content of the cache line does not match the content of the corresponding location of the non-volatile memory, access to modify the content of the cache line is restricted until the content of the cache line is written to the corresponding location of the non-volatile main memory.

The non-volatile main memory may be a storage-class memory. The memory buffer may be a memory write buffer of a CPU or CPU core of the system. The memory buffer may include a plurality of memory write buffers of a plurality of CPUs or CPU cores of the system and the plurality of memory write buffers may work together to provide the memory buffer in accordance with a cache coherency policy. The cache coherency policy may be responsible for controlling access to modify the content of the cache lines. The memory buffer may be a volatile memory.

The one or more bits corresponding to each cache line may encode a state of the associated cache line. The memory transaction may include a plurality of steps and the memory transaction might not be considered to be performed to completion unless and until each of the steps have been successfully transacted. Upon a disruption of power to the system, cache lines associated with those steps of the plurality of steps that have been performed to completion may be erased from the memory buffer if at least one of the steps of the plurality of steps has not been successfully transacted at the time of the disruption of power.

When a second transaction requests access to modify the content of the cache line for which access is restricted, the contents of the cache line may be written to the corresponding location of the non-volatile main memory.

When power for the system is temporarily disrupted, all of the cache lines having one or more bits signifying both that the transaction has been performed to completion and also that the content of the cache line does not match the content of the corresponding location of the non-volatile memory, and only these cache lines, may be copied to a memory device that persists in the absence of the power for the system. The memory device that persists in the absence of the power for the system may include a volatile memory and battery backup. Alternatively, the memory device that persists in the absence of the power for the system may include a non-volatile memory.

A system for conducting memory transactions includes a non-volatile main memory and a memory buffer including a plurality of cache lines. Each of the cache lines includes content and one or more bits signifying whether a memory transaction corresponding to the content of the cache line has been performed to completion and whether the content of the cache line matches content of a corresponding location of the non-volatile main memory. When power for the system is temporarily disrupted, all of the cache lines having one or more bits signifying both that the transaction has been performed to completion and also that the content of the cache line does not match the content of the corresponding location of the non-volatile memory, and only these cache lines, are copied to a memory device that persists in the absence of the power for the system.

The non-volatile main memory may be a storage-class memory. The memory buffer may be a memory write buffer of a CPU or CPU core of the system. The memory device that persists in the absence of the power for the system may either include a volatile memory and battery backup or may include a non-volatile memory.

When the one or more bits of a cache line of the plurality of cache lines signifies that the transaction has been performed to completion and the content of the cache line does not match the content of the corresponding location of the non-volatile memory, access to modify the content of the cache line may be restricted until the content of the cache line is written to the corresponding location of the non-volatile main memory.

A database system for conducting memory transactions includes at least one central processing unit (CPU), a non-volatile main memory, and a memory buffer, associated with the at least one CPU, including a plurality of cache lines. Each of the cache lines includes content and one or more bits signifying whether a database transaction corresponding to the content of the cache line has been performed to completion and whether the content of the cache line matches content of a corresponding location of the non-volatile main memory. The memory buffer executes a cache coherency protocol. The cache coherency protocol dictates that when the one or more bits of a cache line of the plurality of cache lines signifies that the database transaction has been performed to completion and the content of the cache line does not match the content of the corresponding location of the non-volatile memory, access to modify the content of the cache line is restricted until the content of the cache line is written to the corresponding location of the non-volatile memory. Prior to a disruption of power to the memory buffer, all of the cache lines having one or more bits signifying both that the transaction has been performed to completion and also that the content of the cache line does not match the content of the corresponding location of the non-volatile memory, and only these cache lines, are copied to a memory device that persists in the absence of the power for the system.

The non-volatile main memory may be a storage-class memory.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
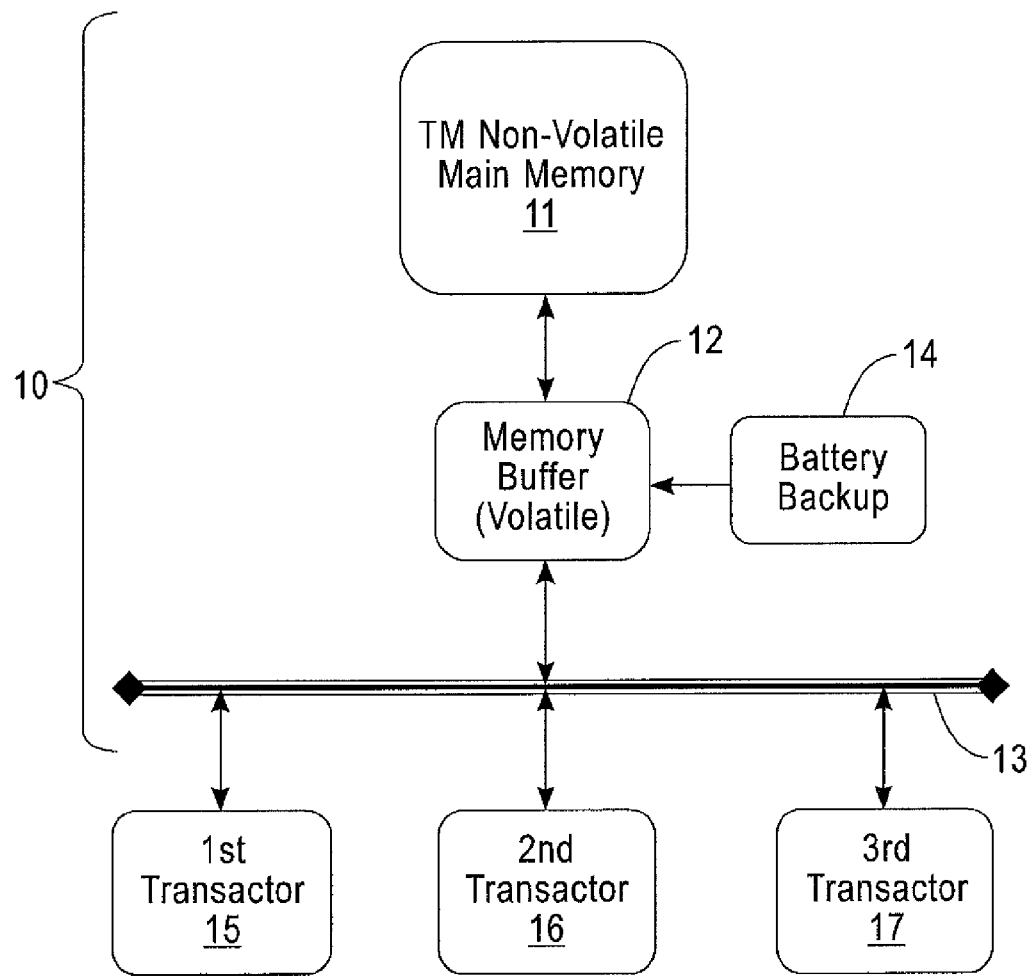
FIG. 1 is a block diagram illustrating a transactional memory (TM) system in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for transactional memory (TM) in which non-volatile memory is used as main memory. Non-volatile memory is memory that is capable of preserving its contents even in the absence of power. Once common form of non-volatile memory in wide use is flash memory. Flash memory, however, has traditionally suffered from relatively slow access speeds as compared to DRAM, in part due to the requirement that erasures be performed on an entire memory block before existing data may be modified.

Some forms of flash-memory, however, are able to achieve high speeds that in many cases can rival DRAM. Moreover, other forms of non-volatile memory can provide high speeds to rival DRAM. These forms of non-volatile memory may be referred to as "storage-class" memory. An example of storage-class memory is phase-change memory. Phase-change memories use electrical currents to heat storage cells and switch their state of matter between crystalline and amorphous. At least because phase-change memories can be modified without first having to perform a block-wise erase operation, high speeds may be obtained.

By utilizing non-volatile memory as main memory in TM systems, exemplary embodiments of the present invention may be able to provide for data integrity even in the event of a power failure, system reset or other temporary or permanent disruption of the system's ability to actively refresh memory contents.

FIG. 1 is a block diagram illustrating a transactional memory (TM) system in accordance with exemplary embodiments of the present invention. The TM system 10 includes a non-volatile main memory 11. The non-volatile main memory 11 may be a high-speed flash memory or a storage-class memory such as a phase-change memory. The non-volatile main memory 11 may be connected to a memory buffer 12. The memory buffer 12 may be a high-speed volatile memory and may serve as a cache for the non-volatile main memory 11. The memory buffer 12 may function as a read buffer and/or a memory write buffer. The memory buffer 12 may include multiple cache lines within which changes to the non-volatile main memory 11 may be temporarily stored. At an opportune time, one or more cache lines from the memory buffer 12 may be written to the non-volatile main memory 11. For each cache line, the memory buffer 12 may record a logical memory address, which represents an address of the non-volatile main memory 11 that the cache line contains updated data for. For example, the logical memory address may be the location that the cache line's contents are written to at the opportune time. The TM system may contain multiple memory buffers 12, however, for simplicity, a single memory buffer 12 is shown and described.

The memory buffer 12 may be connected to a bus 13. The bus may actually include multiple lines of connection and may include, for example, a computer network such as a local area network (LAN), a wide area network (WAN), a virtual private network (VPN), etc. One or more computing entities may access the non-volatile main memory 11 via the bus 13. These computing entities may be referred to herein as "transactors" as they may initiate transactions that are recorded within the non-volatile main memory 11. While there may be any number of transactors in communication with the bus 13, for simplicity, the disclosure discusses a first transactor 15, a second transactor 16, and a third transactor 17.

Figure 2:
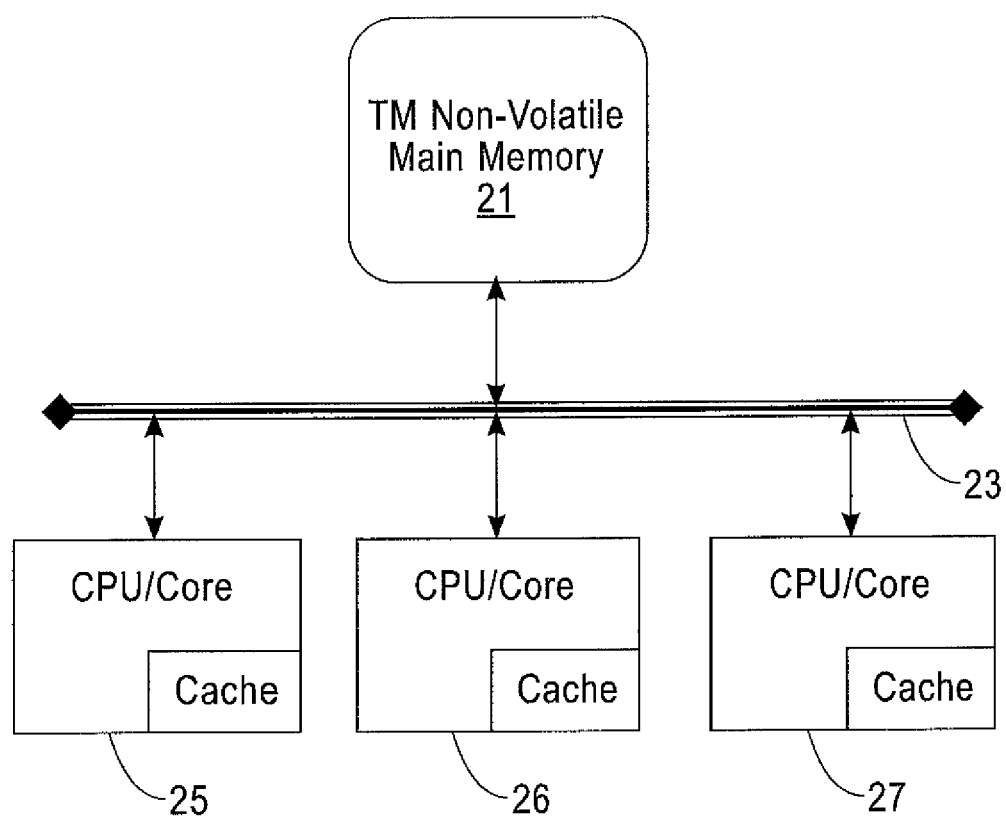
FIG. 2 is a block diagram illustrating a TM system in which the memory buffer is incorporated into a CPU in accordance with exemplary embodiments of the present invention.

The memory buffer may be integrally formed with a central processing unit (CPU) that is responsible for performing the transactions on the main memory. FIG. 2 is a block diagram illustrating a TM system in which the memory buffer is incorporated into a CPU in accordance with exemplary embodiments of the present invention. The memory buffer 22 may include a first memory buffer element 22a, a second memory buffer element 22b, and a third memory buffer element 22c. Each memory buffer element may be an L1 cache associated with a particular CPU core or an L2 or L3 cache that may be shared among multiple cores. Each memory buffer element may be a distinct memory device that is integrated into a corresponding CPU or CPU core 25, 26, or 27. All of the CPUs or CPU cores may communicate along an internal bus 23, which may be a front-side-bus where multiple CPUs are involved.

Each transactor may be a CPU core in a multi-core CPU that is responsible for performing the transactions within the main memory. Alternatively, or additionally, the transactors may be distinct CPUs that share access to the main memory. In such a case, the bus may be a shared bus that connects the multiple CPUs with the shared main memory. As each CPU may have its own cache, the caches of each CPU may together form the memory buffer, with all caches working together in accordance with a cache coherency protocol.

For each cache line, the memory buffer may record, using one or more bits, a state of the corresponding cache line. According to exemplary embodiments of the present invention, the set of available states may include PENDING, COMPLETED, STORED, and UNSTORED. Each cache line may either be PENDING or COMPLETED and either STORED or UNSTORED. A first bit may signify PENDING or COMPLETED and a second bit may signify STORED or UNSTORED. The significance of each state is described in detail below. It should be understood that various names for cache line states are known in the art and the states described herein are novel with respect to their characteristics and function. For example, a cache line that is STORED has content that is identical to corresponding content within the main memory, and accordingly, the STORED state may be analogous to a CLEAN state, as understood in the art. Moreover, a cache line that is UNSTORED has content that is different from corresponding content within the main memory, and accordingly, the UNSTORED state may be analogous to a DIRTY state, as understood in the art. However, as exemplary embodiments of the present invention should not be limited to states of particular names, this analogy is offered as an example.

As discussed above, a transaction may involve implementing one or more changes to the contents of the non-volatile main memory. For example, a transaction may include the transfer of funds from a first bank account to a second bank account. In such a case, the funds may first be deducted from the first bank account and may then be added to the second bank account. As disruption of the TM system may occur during the implementation of the transaction, exemplary embodiments of the present invention seek to provide systems and methods that can tolerate disruption while maintaining data integrity. For example, if the system is disrupted, for example, due to a loss of power, after the funds have been deducted from the first account but before the funds have been added to the second account, exemplary embodiments of the present invention are able to accurately recover from the power disruption without the loss of funds while still maintaining adequate transaction speed.

This may be accomplished, for example, by writing transaction steps to the memory buffer. Steps may be written to the memory buffer with a PENDING state signifying that all steps associated with a given transaction have not been completed and an UNSTORED state signifying that the data exists only in the memory buffer and therefore supersedes data in the main memory. Once all steps have been written to the memory buffer, all of the associated cache lines may be changed to the state COMPLETED signifying that they are ready to be written to the main memory at a time that is convenient to do so. The memory buffer data might not be written back to the main memory immediately as requiring immediate writing back to main memory may slow down the system. Thus, the COMPLETED state serves to signify that the cache lines so labeled are marked to be written back to the main memory. Cache lines that are not marked as COMPLETED are accordingly in the PENDING state and will not be written back to the main memory. This characteristic is in contrast with traditional approaches in which all lines of cache may be freely written back to the main memory in accordance with the policies of the cache, which may be designed to maximize speed and efficient use of cache space.

When the time comes for the cache lines to be written to the main memory, the cache lines may then be marked as STORED to signify that their contents matches that of the main memory. From that point on, the STORED cache lines may either remain in the memory buffer to provide faster reading of this data or may be deleted from the memory buffer without consequence.

If power is disrupted after all completed transactions have been written from the memory buffer to the main memory, and all cache lines associated with the transactions are in the COMPLETED and STORED state, and even though the contents of the memory buffer may be lost, no loss of data would result from the loss of power as the main memory is non-volatile. However, it may be that upon a power failure, some data associated with completed transactions remains exclusively in the memory buffer and not in the main memory. The cache lines associated with data in this state would be marked COMPLETED and UNSTORED. Upon system disruption, exemplary embodiments of the present invention may take steps to preserve cache lines marked COMPLETED and UNSTORED. For example, this data may be written to main memory or may be quickly copied to another non-volatile memory location. A battery backup 14 may be used to supply power to the memory buffer for the time required to make this copy. Cache lines marked COMPLETED and STORED, however, do not need to be preserved.

As discussed above, transactions may have multiple steps, and it is possible for system disruption to occur after the execution of some steps but prior to the execution of other steps. Accordingly, exemplary embodiments of the present invention may mark cache lines containing data pertaining to steps of an incomplete transaction as PENDING until all steps for the transaction have been completed. Once all steps for the transaction have been successfully completed, all of the cache lines associated with all steps of the transaction may be changed from PENDING to COMPLETED.

Cache lines marked as PENDING are not copied to main memory. In the event of a system disruption, cache lines marked PENDING are not preserved. For example, when funds are subtracted from the first account, the subtraction is recorded in the memory buffer as PENDING. Then in the event that the system is disrupted prior to the addition of the funds to the second account, the entire transaction is undone and no funds are lost.

However, if the funds were in fact added to the second account prior to the system failure, then data pertaining to both transactions would be changed to COMPLETED and in the event of a system failure, this data would be preserved.

Accordingly, exemplary embodiments of the present invention do not need to maintain transaction logs as accuracy may always be guaranteed.

Additionally, cache lines marked as PENDING may be permissioned to be under the exclusive control of the transaction being performed. Cache lines so marked would not be readable by other transactors. For example, as in the case described above, if a first step in a transaction subtracts funds from a first bank account, as the transaction has not been finalized, and could possibly be reversed in the event of a system failure, other transactors may be blocked from even reading the balance of the first account, as its value cannot yet be guaranteed. However, once the transaction has completed successfully and the cache lines marked as COMPLETED, the cache lines may be re-permissioned from exclusive to read only until the cache lines are written to the main memory and the state changed from UNSTORED to STORED.

UNSTORED cache lines may be permissioned to be read only so that other transactors are permitted to read the data stored therein but are blocked from making changes to that data. By keeping UNSTORED data as read only, the integrity of the data may be preserved. This is because if the data were allowed to be modified; then its state would be allowed to change from COMPLETED to PENDING, and the data would not be preserved in the event of a system disruption. Thus in accordance with exemplary embodiments of the present invention, cache lines marked as UNSTORED are permissioned as read only. However, exemplary embodiments of the present invention may initiate a process to write the UNSTORED cache lines to main memory when another transaction requests write access to this data. In such an event, the cache lines may be written to the main memory, the state may be changed to STORED, and the permission may be returned to shared.

Table 1 below summarizes the set of states and permissions in accordance with exemplary embodiments of the present invention. It should be noted that under the above-described system, it is not possible for a cache line to be marked as both PENDING and STORED as transactions that are not fully completed are prevented from being written to the main memory. It should also be noted that exemplary embodiments of the present invention may treat permissions as states.

TABLE 1

|  | PENDING | COMPLETED |
| --- | --- | --- |
| UNSTORED | EXCLUSIVE | READ ONLY |
| STORED | N/A | SHARED |

The READ ONLY (RO) permission signifies that the content of the associated cache line may be read but cannot be overwritten. The EXCLUSIVE permission signifies that the content of the associated cache line may be accessed only by the transactor involved with performing a transaction. The SHARED permission signifies that the content of the associated cache line may be accessed by any transactors.

Figure 3:
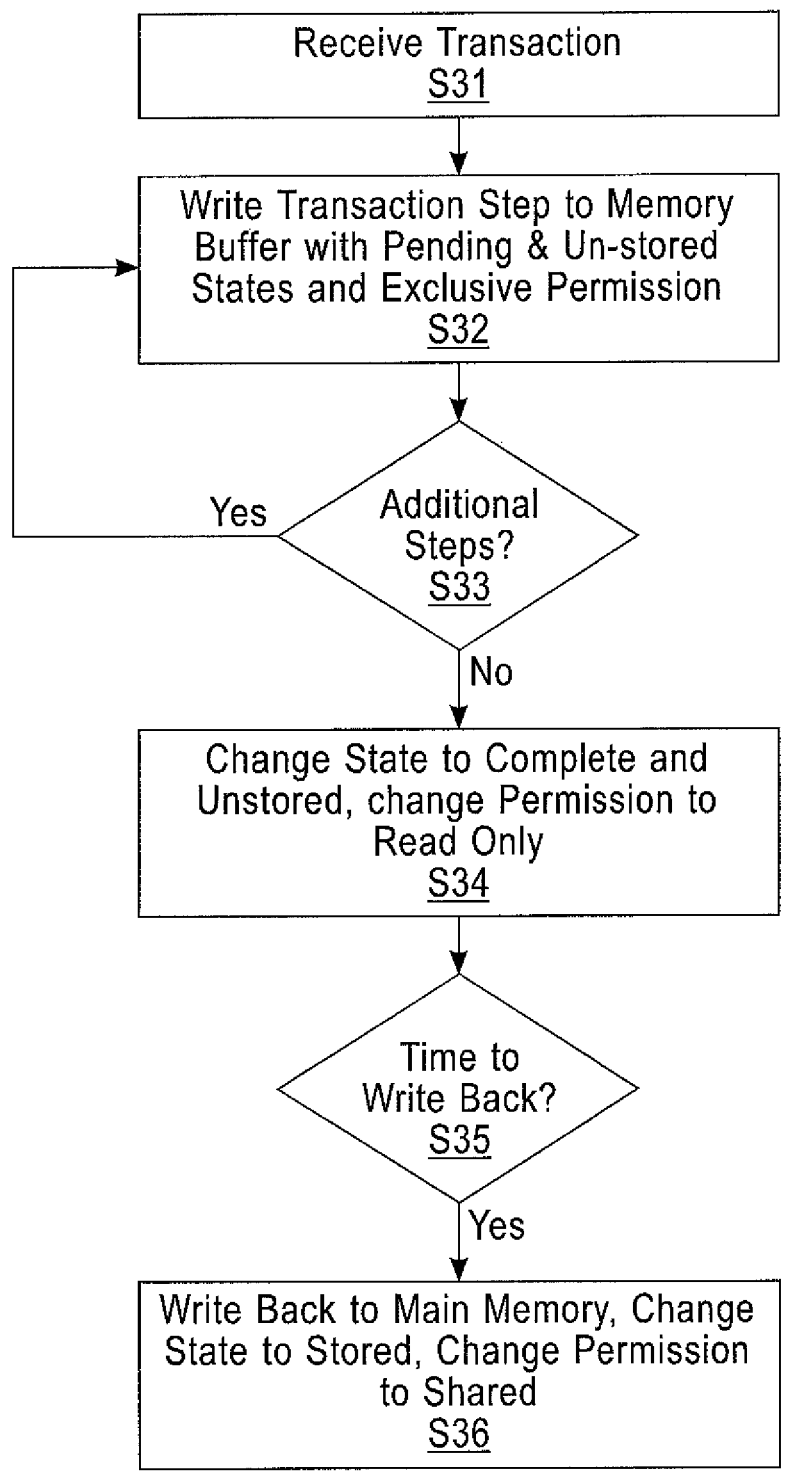
FIG. 3 is a flow chart illustrating a method for performing durable transactions in accordance with exemplary embodiments of the present invention

FIG. 3 is a flow chart illustrating a method for performing durable transactions in accordance with exemplary embodiments of the present invention. The description of this process may begin with the receiving of a transaction (Step S31). The transaction may be a request from an entity to make a change to the data of the main memory. For example, the transaction may be a sequence of one or more database transactions. Upon receipt of the transaction, the steps of the transaction may be written to the memory buffer (Step S32). Where the transaction comprises multiple steps, the steps may be written to the memory buffer one at a time. However, the permission of the cache lines in the memory buffer that the transaction relates to may be changed to be under the exclusive control of the particular transaction being performed. This may mean that no other transactions may be able to read or write to these cache lines of the memory buffer.

The state of the involved cache lines may also be marked as both PENDING and UNSTORED. If prior to executing the transaction, it is determined that the permissions for the involved cache lines are already EXCLUSIVE or RO, for example, because another transaction is in the process of being performed, then the system may wait until the permissions are changed to shared. However, if the permission is set to RO because the states are marked as COMPLETED and UNSTORED, then the writing of the cache lines back to main memory may be initiated so that the state may be changed to STORED and the permission changed to SHARED.

After a first transaction step has been performed (Step S32), it may be determined whether the there are additional steps to be performed for that transaction (Step S33). Performance of the transaction steps (Step S32) may be repeated for as long as there are additional steps to be performed (Yes, Step S33). When all steps have been completed (No, Step S33), the state of the involved cache lines may be changed to COMPLETED and the permission may be changed to RO (Step S34).

The permission may remain as RO until the involved cache lines are written back to main memory. The determination as to when it is time to write the involved cache lines back to main memory (Step S35) may depend on multiple factors. For example, the replacement policy of the memory buffer may determine when it is time to write the involved cache lines to main memory. The replacement policy may be designed to consider the available space of the memory buffer and the present demands placed upon it. For example, if additional space is needed to be freed up within the memory buffer, cache lines may be written to main memory so that the space they occupy within the memory buffer may be released. Additionally, where another transaction desires to access the involved cache lines, the contents of the cache lines may be written back to the main memory so that permission may be changed to SHARED.

In either case, when it is determined that it is time to write back the involved cache lines to the main memory (Yes, Step S35), the data may be written back to the main memory, at which time the state may be changed to STORED and the permission changed to SHARED (Step S36).

Figure 4:
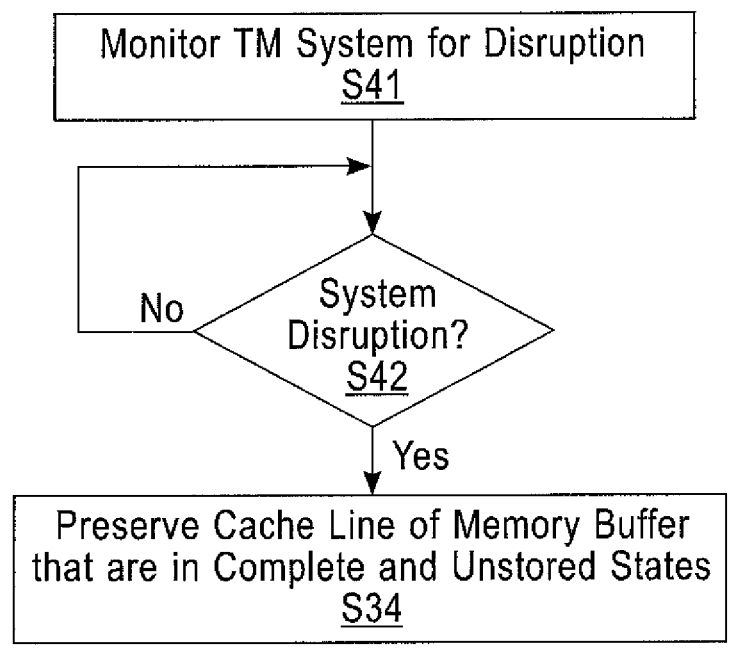
FIG. 4 is a flow chart illustrating a process for dealing with a disruption to the TM system in accordance with exemplary embodiments of the present invention.

FIG. 4 is a flow chart illustrating a process for dealing with a disruption to the TM system, for example, due to temporary power failure, which may occur at any point within the execution of the process described above with respect to FIG. 3. The system may be monitored to identify a disruption that may affect the ability of the memory buffer to maintain its data (Step S41). This may be, for example, a power disruption or a component failure. Upon the identification of a system disruption (Yes, Step S42), one or more steps may be taken to preserve those cache lines of the memory buffer than contain data relating to completed transactions that were not yet written back to main memory (Step S43). These cache lines may thus have the states COMPLETED and UNSTORED. Cache lines that have already been written back (STORED) or those cache lines that relate to incomplete transactions (PENDING) may be permitted to expire, along with other portions of the memory buffer, without loss of data. Moreover, according to the technique described herein, transaction logs need not be maintained as the data associated with completed transactions is not lost and yet unfinished transactions are in essence reversed by the disruption of power.

The COMPLETED and UNSTORED cache lines may be preserved, for example, using a battery backup and/or by copying the contents to a non-volatile memory such as a flash memory prior to the full loss of power, for example, while under battery backup power. The non-volatile memory may be the main memory or a distinct memory device. Alternatively, exemplary embodiments of the present invention may initiate the writing back of this data from the memory cache to the main memory upon the detection of the disruption. By acting to preserve only those cache lines marked COMPLETED and UNSTORED, exemplary embodiments of the present invention may assure the preservation of competed transactions, assure that incomplete transactions do not impact main memory, and may assure that the quantity of data in need of preservation in the event of disruption be minimized. As noted above, activity logs need not be used to assure the accuracy of data and thus, their generation may be omitted.

Upon resumption of the TM system, the contents of the backup memory where the cache lines marked COMPLETED and UNSTORED may either be written back to the memory buffer or written directly to the main memory.

As described above, a cache coherency protocol may be used to coordinate cache access by what may be a plurality of memory write buffers associated with each of a plurality of CPU cores and/or CPUs. Exemplary embodiments of the present invention may require that a known protocol be modified. One example of a cache coherency protocol that may be so modified is the MESI protocol. Here, four states are established: The modified state (M) indicates that an associated cache line is valid in the cache and is not valid in any other caches. The lines is modified with respect to the main memory and has thus not yet been written back to memory. The exclusive state (E) indicates that the addressed line is in this cache only and is consistent with the main memory. The shared state (S) indicates that the line is valid in the cache and in at least one other cache. A shared line is always consistent with main memory. The invalid state (I) indicates that the address lines is not resident in the cache and accordingly, the data contained in invalid lines are not useful.

Table 2 below illustrates various MESI states along with associated events, actions, and new states that may result therefrom:

TABLE 2

| STATE | EVENT | ACTION | NEXT STEP |
|---|---|---|---|
| Invalid | Read miss, shared (cache copies exist) | Read cache line | Shared |
| | Read miss, exclusive (no cache copies exist) | Read cache line | Exclusive |
| | Write miss | Broadcast invalidate/read cache line/modify cache line | Modified |
| Shared | Read hit | | Shared |
| | Write hit | Broadcast invalidate | Modified |
| | Snoop hit on read | | Shared |
| | Snoop hit on invalidate | Invalidate cache line | Invalid |
| Exclusive | Read hit | | Exclusive |
| | Write hit | | Modified |
| | Snoop hit on read | | Shared |
| | Snoop hit on invalidate | Invalidate cache line | Invalid |
| Modified | Read hit | | Modified |
| | Write hit | | Modified |
| | Snoop hit on read | Write cache line back to memory | Shared |
| | Snoop hit on invalidate | Write cache line back to memory | Invalid |
| | LRU replacement | Write cache line back to memory | Invalid |

Exemplary embodiments of the present invention may modify the MESI protocol, or another known cache coherency protocol, to accommodate one or more of the features described above, for example, the assigning of RO permission to cache lines that are COMPLETED and UNSTORED. This permission ensures that committed transactions that are only present in the cache, and not yet written to the main memory, do not get changed again prior to being written back to main memory. This may be implemented by adding to the cache coherency protocol, a new state signifying the read only permission. This state may be called, for example TMODIFIED and may be attributed to cache lines described above as being COMPLETED and UNSTORED, although these states need not be used. Cache lines marked as TMODIFIED may be preserved in the event of a power disruption by either making the entire cache non-volatile, which may not always be practical, or by storing a copy of TMODIFIED cache lines to a battery-backed up write buffer.

Under this approach, cache lines that are designated TMODIFIED may be valid in the cache and only in the cache. The lines so designated are modified with respect to the main memory and thus these lines are to be written back to main memory before additional access is granted to these cache lines.

Table 3 below illustrates various MESI states along with the new TMODIFIED state in accordance with exemplary embodiments of the present invention:

TABLE 3

| STATE | EVENT | ACTION | NEXT STEP |
|---|---|---|---|
| Invalid | Read miss, shared (cache copies exist) | Read cache line | Shared |
| | Read miss, exclusive (no cache copies exist) | Read cache line | Exclusive |
| | Write miss | Broadcast invalidate/read cache line/modify cache line | Modified |
| Shared | Read hit | | Shared |
| | Write hit | Broadcast invalidate | Modified |
| | Snoop hit on read | | Shared |
| | Snoop hit on invalidate | Invalidate cache line | Invalid |
| Exclusive | Read hit | | Exclusive |
| | Write hit | | Modified |
| | Snoop hit on read | | Shared |
| | Snoop hit on invalidate | Invalidate cache line | Invalid |
| Modified | Read hit | | Modified |
| | Write hit | | Modified |
| | Commit | | TModified |
| | Snoop hit on read | Write cache line back to memory | Shared |
| | Snoop hit on invalidate | Write cache line back to memory | Invalid |
| | LRU replacement | Write cache line back to memory | Invalid |
| TModified | Read Hit | | TModified |
| | Write hit | Write cache line back to memory | Modified |
| | Snoop hit on read | Write cache line back to memory | Shared |
| | Snoop hit on invalidate | Write cache line back to memory | Invalid |
| | LRU Replacement | Write cache line back to memory | Invalid |

Figure 5:
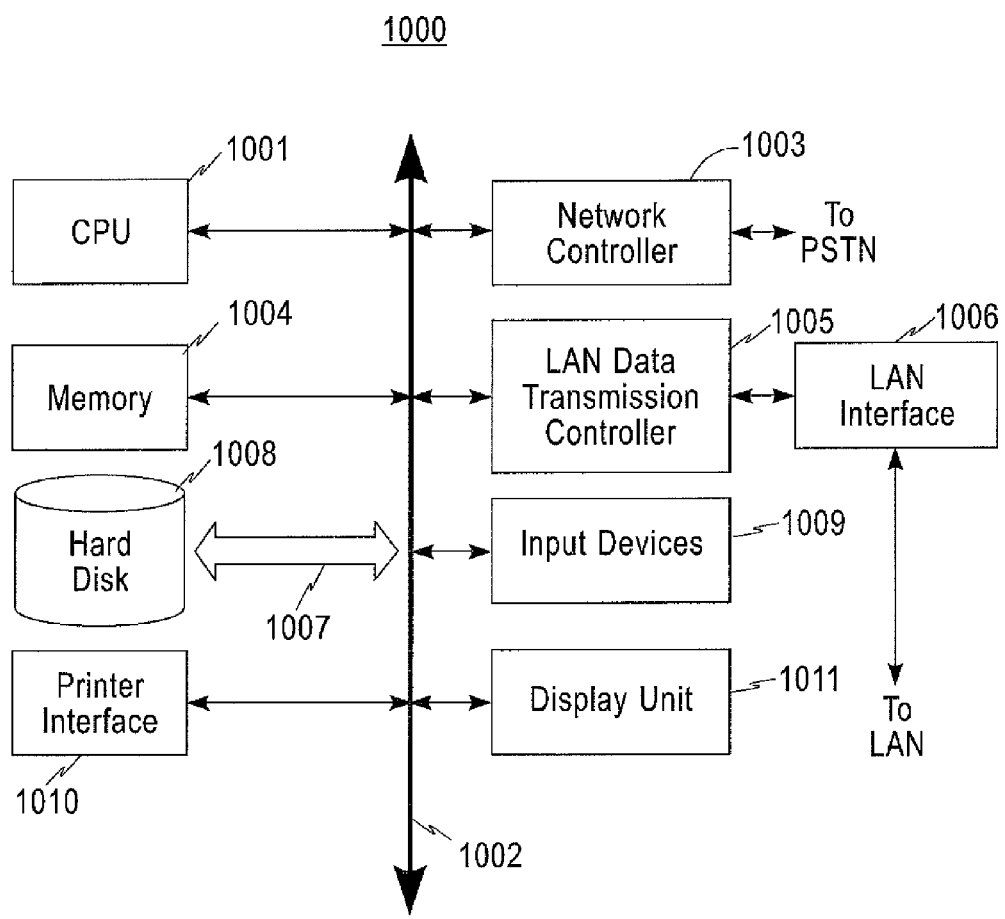
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for conducting memory transactions, comprising:
    a non-volatile main memory; and
    a memory buffer including a plurality of cache lines, each of the cache lines including content stored therein by a write command associated with a single transaction that includes multiple distinct write commands that form the single transaction, each of the cache lines including a first bit signifying whether all of the distinct write commands associated with the transaction, corresponding to the content of the cache line, have been performed to completion and each of the cache lines including a second bit signifying whether the content of the cache line matches content of a corresponding location of the non-volatile main memory,
    wherein when the first bit of a cache line of the plurality of cache lines signifies that all of the distinct write commands associated with the transaction have not been performed to completion and the second bit of the cache line of the plurality of cache lines signifies that the content of the cache line does not match the content of the corresponding location of the non-volatile main memory, the cache line is set to be unreadable by all transactions except the single transaction,
    wherein when the first bit of the cache line of the plurality of cache lines signifies that all of the distinct write commands associated with the transaction have been performed to completion and the second bit of the cache line signifies that the content of the cache line does not match the content of the corresponding location of the non-volatile memory, the cache line is set to be in a read-only state, and
    wherein when the first bit of the cache line of the plurality of cache lines signifies that all of the distinct write commands associated with the transaction have been performed to completion and the second bit of the cache line signifies that the content of the cache line does match the content of the corresponding location of the non-volatile memory, the cache line is set to be in a shared state.

2. The system of claim 1, wherein the non-volatile main memory is a storage-class memory.

3. The system of claim 1, wherein the memory buffer is a memory write buffer of a CPU or CPU core of the system.

4. The system of claim 3, wherein the memory buffer comprises a plurality of memory write buffers of a plurality of CPUs or CPU cores of the system and the plurality of memory write buffers work together to provide the memory buffer in accordance with a cache coherency policy.

5. The system of claim 4, wherein the cache coherency policy is responsible for controlling access to modify the content of the cache lines.

6. The system of claim 1, wherein the memory buffer is a volatile memory.

7. The system of claim 1, wherein upon a disruption of power to the system, cache lines associated with the distinct write commands that have been completed but are part of a transaction for which at least one write command associated therewith has not been completed, are erased from the memory buffer.

8. The system of claim 1, wherein when the first bit of a cache line of the plurality of cache lines signifies that all of the distinct write commands associated with the transaction have not been performed to completion and the second bit of the cache line of the plurality of cache lines signifies that the content of the cache line does not match the content of the corresponding location of the non-volatile main memory, the cache line is prevented from being written to the non-volatile main memory.

9. The system of claim 8, wherein the cache line is prevented from being written to the non-volatile main memory by setting the cache line in a TMODIFIED state and implementing a cache coherency policy that does not write cache lines in a TMODIFIED state to the non-volatile main memory.

10. The system of claim 1, wherein when the first bit of a cache line of the plurality of cache lines signifies that all of the distinct write commands associated with the transaction have not been performed to completion and the second bit of the cache line of the plurality of cache lines signifies that the content of the cache line does not match the content of the corresponding location of the non-volatile main memory, the cache line is prevented from being written to the non-volatile memory and the cache line is written to a battery-backed-up write buffer that is different from the non-volatile memory and the memory buffer.

11. The system of claim 10, wherein the cache line is prevented from being written to the non-volatile main memory by setting the cache line in a TMODIFIED state and implementing a cache coherency policy that does not write cache lines in a TMODIFIED state to the non-volatile main memory.

* * * * *